United States Patent
van Schoor et al.

(10) Patent No.: US 10,871,237 B2
(45) Date of Patent: Dec. 22, 2020

(54) DUAL STAGE PRESSURE RELIEF VALVE

(71) Applicant: Oatey Co., Cleveland, OH (US)

(72) Inventors: Marthinus Cornelius van Schoor, Arlington, MA (US); Attila Jozsef Lengyel, Medford, MA (US); Luke Clovis Saindon, Malden, MA (US); Nicholas Burnell, Burlington, MA (US)

(73) Assignee: OATEY CO., Cleveland, OH (US)

( * ) Notice: Subject to any disclaimer, the term of this patent is extended or adjusted under 35 U.S.C. 154(b) by 190 days.

(21) Appl. No.: 16/100,540

(22) Filed: Aug. 10, 2018

(65) Prior Publication Data

US 2019/0072195 A1   Mar. 7, 2019

Related U.S. Application Data

(60) Provisional application No. 62/553,573, filed on Sep. 1, 2017.

(51) Int. Cl.
*F16K 17/04* (2006.01)
*F16K 17/08* (2006.01)

(52) U.S. Cl.
CPC ............ *F16K 17/04* (2013.01); *F16K 17/044* (2013.01); *F16K 17/082* (2013.01)

(58) Field of Classification Search
CPC ....... F16K 17/04; F16K 17/044; F16K 17/082
See application file for complete search history.

(56) References Cited

U.S. PATENT DOCUMENTS

| | | | | |
|---|---|---|---|---|
| 2,366,596 A | * | 1/1945 | Clifton | F16K 17/105 137/491 |
| 2,882,922 A | * | 4/1959 | Schindel | F16K 17/105 137/491 |
| 3,902,528 A | * | 9/1975 | Tartabini | G01M 3/2853 138/90 |
| 6,142,176 A | * | 11/2000 | Sagawa | F16K 17/082 137/514 |
| 2004/0089347 A1 | * | 5/2004 | Cavagna | F16K 17/10 137/491 |
| 2005/0178443 A1 | * | 8/2005 | Cheong | F16K 17/105 137/491 |

* cited by examiner

*Primary Examiner* — Jessica Cahill
*Assistant Examiner* — Patrick C Williams
(74) *Attorney, Agent, or Firm* — BakerHostetler

(57) ABSTRACT

A dual stage pressure relief valve for relieving pressure. The pressure relief valve includes a main body, a poppet bulb, a pilot piston, and a poppet cap. The main body defines a main channel that extends from a first opening to a second opening. The poppet bulb defines a first flow channel being in fluid communication with the main channel. The pilot piston defines a reset channel in fluid communication with the first flow channel of the poppet bulb. The cap channel has a diameter that is greater than a diameter of the reset channel. The poppet cap defines a cap channel in fluid communication with the reset channel of the pilot piston and with a pressure cavity defined by the poppet cap and an end of the main body.

20 Claims, 10 Drawing Sheets

DUAL STAGE PRESSURE RELIEF VALVE

TECHNICAL FIELD

The present invention relates to a dual stage pressure relief valve and method, and more particularly, to systems, methods, and apparatus for relieving a pressure within inflatable plugs.

BACKGROUND

Pipelines are generally known to transport fluids (liquids or gases) over a physical distance within the internal channels of the constituent individual pipe sections. The pipe sections often run underground and are not easily accessible.

Inflatable plugs are used for repairing the pipe sections. During inflation, the inflatable plug may exceed a pressure threshold. Current systems often employ a pressure relief valve to relieve pressure exceeding upper pressure threshold limits within the plug.

Conventional inflatable plugs use single stage relief valves to relieve pressure within the plug. Using single stage relief valves to relieve pressure within an inflatable plug has several disadvantages. For example, in order to relieve pressure using a single stage relief valve requires an overpressure within the plug to relieve the pressure at a high flow rate. The flow rate increases linearly with pressure increases within the plug, such that if the pressure within the plug only slightly exceeds the pressure threshold the flow rate would be small. Whereas if the pressure within the plug exceeds the pressure threshold by a significant amount the flow rate would be large. Single stage relief valves also have large pressure hysteresis and are susceptible to clogging from the environment. Pressure hysteresis is defined as the difference between the pressure at which a relief valve opens and the pressure at which it closes, which will always be a lower pressure.

An improved and/or simplified relief valve for an inflatable plug is desired to reduce pressure hysteresis, and to increase the relieving flow rate for an incremental increase in pressure within the plug.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

An aspect of the present disclosure provides a pressure relief valve for an inflatable plug. The pressure relief valve comprises a main body, a poppet bulb, a pilot piston, and a poppet cap. The main body has a first end and a second end. The first end of the main body defines a main channel that extends from a first opening to a second opening. The poppet bulb defines a first flow channel. The first flow channel extends through the poppet bulb from a first opening to a second opening. The first opening of the first flow channel is in fluid communication with the main channel. The pilot piston defines an inlet channel, a pressure channel, and a reset channel. The inlet channel extends from a first opening to the pressure channel and to the reset channel. The first opening of the inlet channel is in fluid communication with the first flow channel of the poppet bulb. The poppet cap defines a cap channel. The cap channel extends through the poppet cap from a first opening to a second opening. The first opening of the cap channel is in fluid communication with the reset channel of the pilot piston. The cap channel has a diameter that is greater than a diameter of the reset channel. The second opening of the cap channel is in fluid communication with a pressure cavity defined by the poppet cap and the second end of the main body.

The pressure relief valve is operable between a closed position and an open position. In the closed position, the poppet bulb is located adjacent to the second opening of the main channel and in contact with an inner surface of the main channel such that a fluid flow through the main channel is substantially prevented. In the open position, the poppet bulb is axially spaced from the second opening of the main channel toward the second end of the main body such that a fluid flow through the main channel is allowed.

Another aspect of the present disclosure provides a plug system for sealing a pipeline. The plug system comprises an inflatable plug and a dual stage pressure relief valve. The inflatable plug includes a tubular member having an outer surface that extends from a first end to a second end, and a first plate and a second plate secured to the first end and the second end of the tubular member, respectively. The first plate, the second plate, and the inner surface of the tubular member together define a central chamber of the inflatable plug. The dual stage pressure relief valve is coupled to at least one of the first plate or the second plate. The dual stage pressure relief valve is configured to release a pressure within the inflatable plug after a desired upper pressure limit is achieved within the inflatable plug.

Another aspect of the present disclosure provides a pressure relief valve. The pressure relief valve comprises a main body, a poppet bulb, a pilot piston, and a poppet cap. The main body has a first portion and a second portion. The first portion defines a main channel that extends from a first opening to a second opening. The second portion defines a component chamber. The poppet bulb is positioned within the component chamber and defines a first flow channel that is in fluid communication with the main channel. The pilot piston is positioned adjacent to the poppet bulb within the component chamber and defines a reset channel. The reset channel is in fluid communication with the first flow channel of the poppet bulb. The poppet cap defines a cap channel. The cap channel is in fluid communication with the reset channel of the pilot piston. The cap channel has a diameter that is greater than a diameter of the reset channel, the second opening of the cap channel is in fluid communication with a pressure chamber that is defined by the poppet cap, the second portion of the main body, and a body cap.

The pressure relief valve is operable between a closed position and an open position. In the closed position, the poppet bulb is located adjacent to the second opening of the main channel and in contact with an inner surface of the main channel such that a fluid flow through the main channel is substantially prevented. In the open position, the poppet bulb is spaced away from the second opening of the main channel such that a fluid flow through the second opening to atmosphere is allowed.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter.

Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

The disclosure relates generally to pressure relief valves for relieving pressure within inflatable plugs. In one aspect, a dual stage pressure relief valve is coupled to an end of an inflatable plug. When the inflatable plug is being inflated, if a pressure within the plug exceeds a pressure threshold, the dual stage pressure relief valve relieves the internal pressure until it falls below the pressure threshold. The dual stage pressure relief valve is configured to have a small hysteresis, such that the valve opens and allows a high flow relief as soon as the pressure threshold is exceeded, and closes immediately after the pressure falls below the pressure threshold.

Although the system and methods are described herein in the context of an inflatable plug, it is understood that the valves, systems, and methods described herein may be implemented in other systems to relieve pressure, such as, for example, pressure vessels, pressurized pipes, or other pressurized containers.

Figure 1:
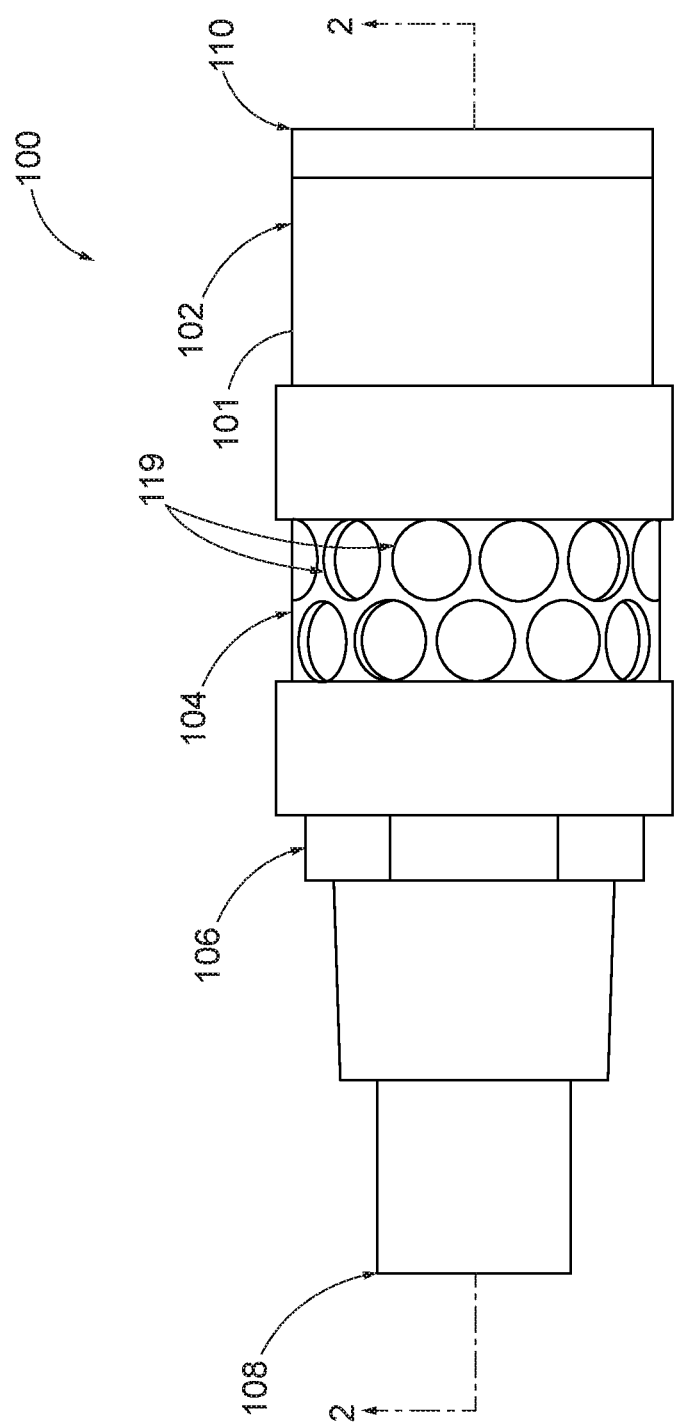
FIG. 1 illustrates a side view of a pressure relief valve in which the systems, methods, and apparatus disclosed herein may be embodied.

FIG. 1 provides a side view of a dual stage pressure relief valve 100, according to an aspect of this disclosure. The relief valve 100 includes a main body 102 and an outlet screen 104. The outlet screen 104 is coupled to an outer surface 101 of the main body 102 and is configured to protect the relief valve 100 from external contaminants entering into the relief valve 100. The outlet screen 104 may be integrally formed onto the outer surface 101. The relief valve 100 further includes a securing component 106, such as a hex nut, configured to secure the relief valve 100 to an inflatable plug. The main body 102 extends from a first end 108 (e.g. bottom end) to a second end 110 (e.g. top end).

Certain terminology used in this description is for convenience only and is not limiting. The words "bottom," "top," "bottommost," "topmost," "above," "below," "axial," and "radial" designate directions in the drawings to which reference is made. The term "substantially" is intended to mean considerable in extent or largely but not necessarily wholly that which is specified. The terminology includes the above-listed words, derivatives thereof and words of similar import.

The dual stage pressure relief valve 100 as disclosed herein may be made of aluminum, steel, plastic, or any other material or combination of materials known in the art that has the strength, durability, and corrosion resistance that is required for operating pressure range of the plug or pressure container on which the pressure relief valves are installed.

Figure 2:
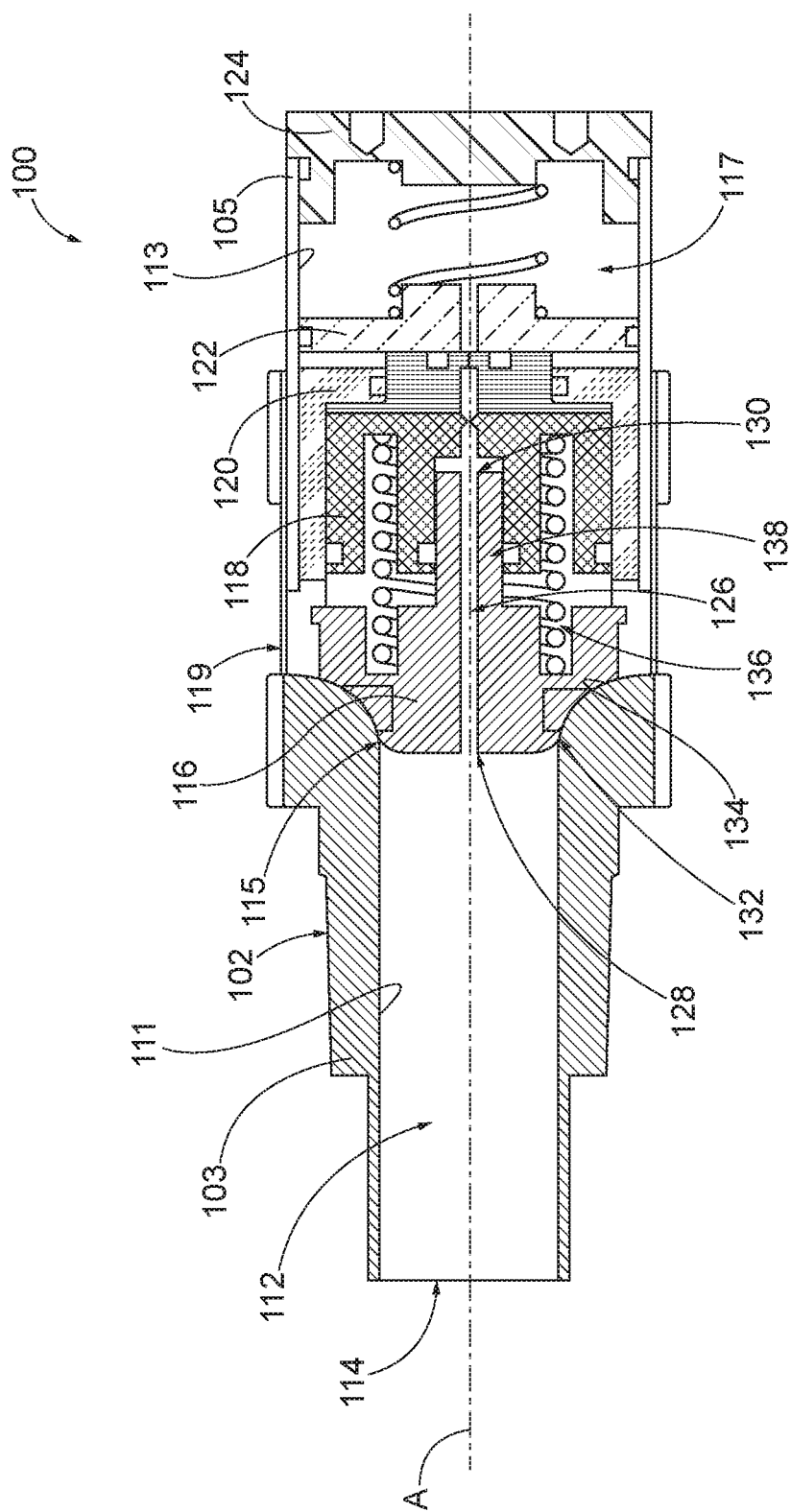
FIG. 2 illustrates a cross sectional view of the pressure relief valve illustrated in FIG. 1 taken along line 2-2 in a closed position.
Figure 3:
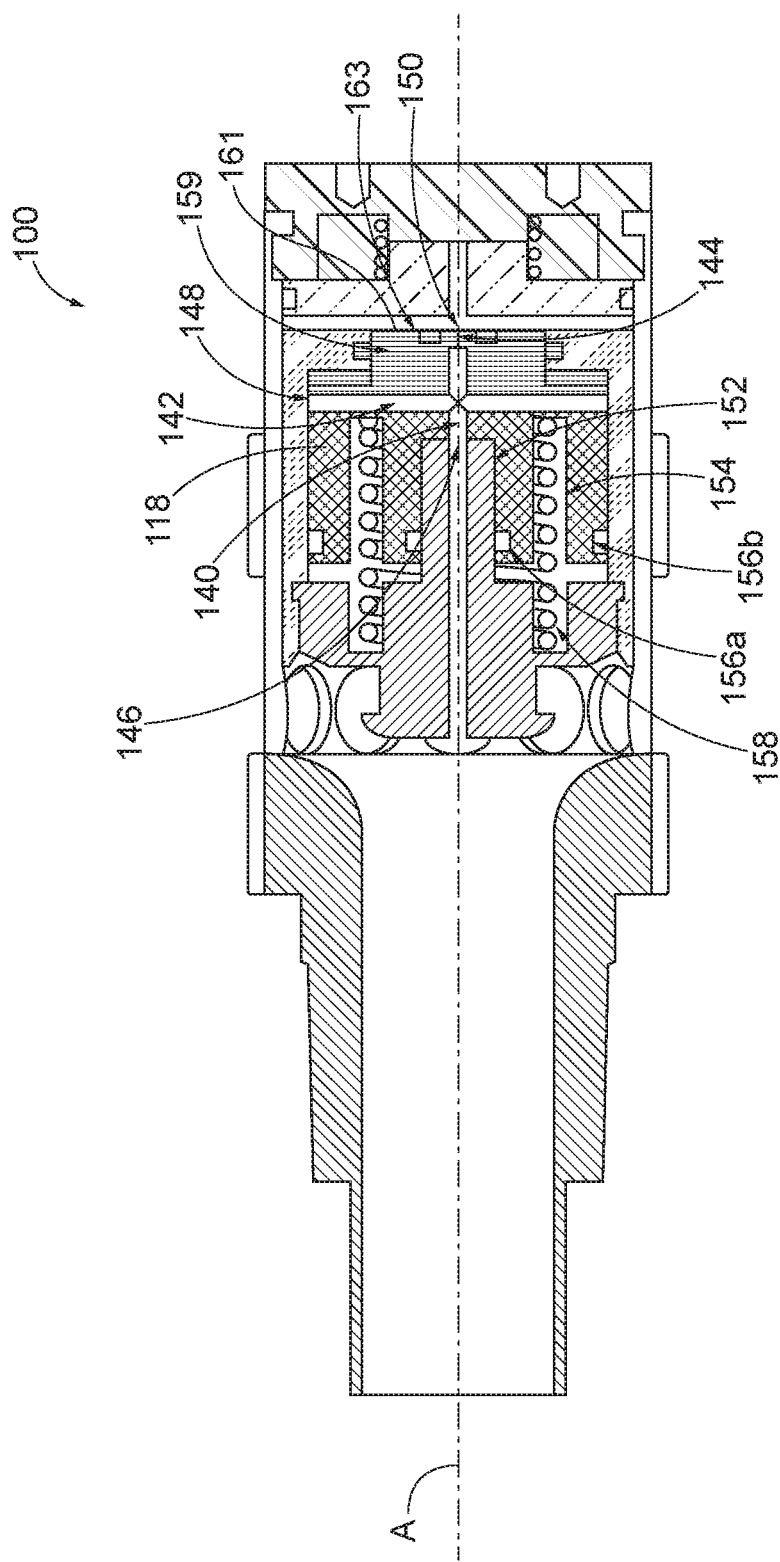
FIG. 3 illustrates a cross sectional view of the pressure relief valve illustrated in FIG. 1 taken along line 2-2 in an open position.

FIGS. 2 and 3 provide side views of a cross section of the dual stage relief valve 100 in a closed position and in an open position, respectively, taken along line 2-2 of FIG. 1. The second end 110 of the main body 102 is spaced from the first end 108 along an axial axis A. The main body 102 includes a first body portion 103 and a second body portion 105. The first body portion 103 includes a first inner surface 111 that defines a main channel 112. The main channel 112 extends from a first opening 114 located at the first end 108 to a second opening 115 spaced from the first opening 114 towards the second end 110 of the main body 102.

In an aspect, the first end 108 of the first body portion 103 may include a filter (not shown) positioned thereon. The filter is configured to prevent contaminants from inside the pressure vessel to which the relief valve 100 is attached from entering into the relief valve 100.

The second body portion 105 includes a second inner surface 113 that defines a component chamber 117. The second body portion 103 further includes at least one hole 119. The at least one hole 119 connects the component chamber 117 to an exterior of the main body 112. The at least one hole 119 may include a plurality of holes that are spaced circumferentially about the second body portion 105. In an aspect, the holes 119 may include a row of a plurality of holes or a plurality of rows of the plurality of holes spaced along the second body portion 105.

The dual stage relief valve 100 further includes a poppet bulb 116, a pilot piston 118, a poppet body 120, a poppet cap 122, and a main body cap 124. The pilot piston 118, the poppet body 120, and the poppet cap 122 are positioned within the component chamber 117 of the second body portion 103. The main body cap 124 is coupled to a topmost end of the second body portion 103, and defines at least a portion of the second end 110 of the main body 102. The poppet bulb 116 is positioned within the component chamber 117 and may extend at least partially within the main channel 112 of the first body portion 103 when the relief valve 100 is in the closed position.

The poppet bulb 116 defines a first flow channel 126. The first flow channel 126 extends through the poppet bulb 116 from a first opening 128 to a second opening 130. The first opening 128 of the poppet bulb 116 is in fluid communication with the main channel 112.

The poppet bulb 116 includes an annular sealing ring 132, an annular sealing surface 134, an annular groove 136, and a piston extension 138. Each of the annular sealing ring 132, the annular sealing surface 134, the annular groove 136, and the piston extension 138 extend circumferentially about the axial axis A. In the closed position of the relief valve 100, the annular sealing ring 132 and annular sealing surface 134 are in contact with the first inner surface 111 at the second opening 115 of the main channel 112, which substantially prevents fluid flow through the second opening 115.

With reference to FIG. 3, the pilot piston 118 defines an inlet channel 140, a pressure channel 142, and a reset channel 144. The inlet channel 140 extends from a first opening 146 in the pilot piston 118 to the pressure channel 142 and the reset channel 144. The first opening 146 of the pilot piston 118 is in fluid communication with the first flow channel 126 defined by the poppet bulb 116. The pressure channel 142 extends from the inlet channel 140 to a pressure outlet 148. It will be appreciated that the pressure channel 142 may include a plurality of pressure channels that extend from the inlet channel 140 to a plurality of pressure outlets. The reset channel 144 extends from the inlet channel 140 to a refill outlet 150.

The pilot piston 118 further defines a first annular groove 152, a second annular groove 154, and at least one first sealing groove 156a,b. The first annular groove 152 is configured to slidably receive the piston extension 138 of the poppet bulb 116 within. The first sealing groove 156a is positioned within the first annular groove 152 and is configured to receive an o-ring (not shown) within. The o-ring is configured to fluidly seal the piston extension 138 with the first annular groove 152.

The second annular groove 152 of the pilot piston 118 and the annular groove 136 of the poppet bulb 116 are aligned in an axially direction substantially parallel to the axial axis A, and both grooves 136 and 152 are configured to receive a first spring 158 (e.g. pilot spring) within. The first spring 158 is configured to bias the poppet bulb 116 and the pilot piston 118 in opposing directions. It will be appreciated that the first spring 158 may include a compression spring, a constant force spring, a Belleville spring, a Belleville washer, beveled washer, disc spring, a conical spring, combinations thereof, or still other types of springs. It will also be appreciated that the first spring 158 may include other resilient members known and used in the art.

The pilot piston 118 includes a poppet extension 159 at a topmost portion of the pilot piston 118. The poppet extension 159 has an upper surface 161 that defines a second sealing groove 163. The second sealing groove 163 extends circumferentially about the reset channel 144.

Figure 4:
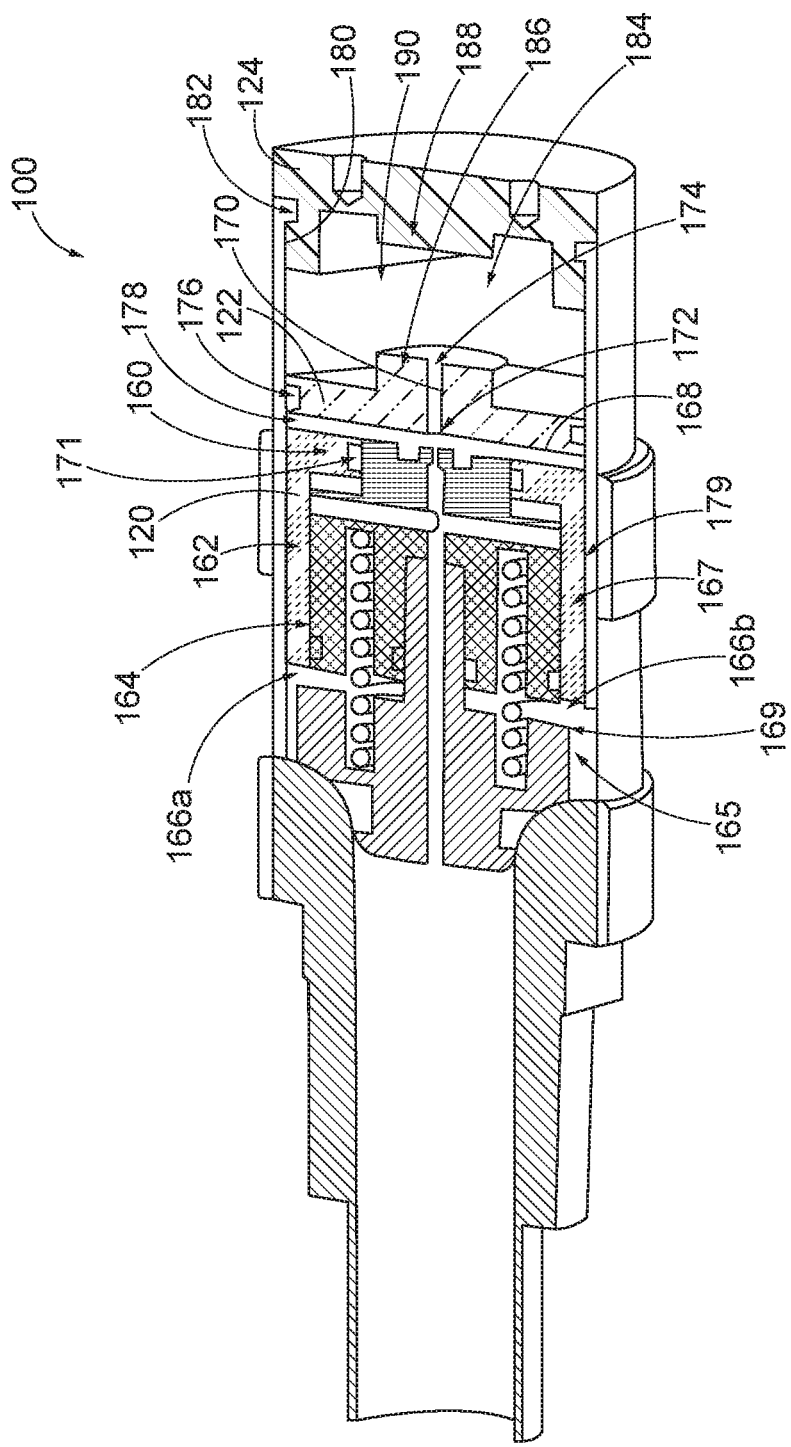
FIG. 4 illustrates a cross sectional view of the pressure relief valve illustrated in FIG. 1 taken along line 2-2 in a first intermediate position.
Figure 5:
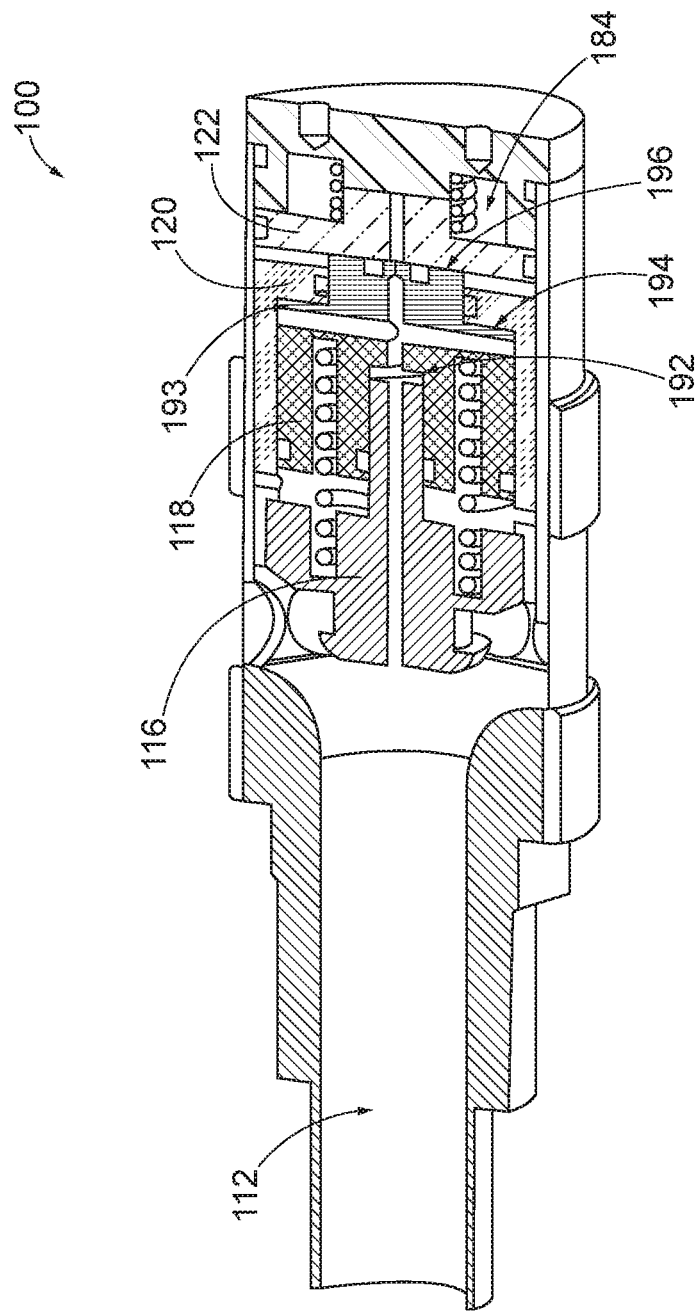
FIG. 5 illustrates a cross sectional view of the pressure relief valve illustrated in FIG. 1 taken along line 2-2 in a second intermediate position.

FIGS. 4 and 5 provide side views of a cross section of the dual stage relief valve 100 in a first intermediate position and in a second intermediate position, respectively, taken along line 2-2 of FIG. 1. The poppet body 120 includes an end plate 160 and a sidewall 162 that extends from the end plate 160. The end plate 160 and the sidewall 162 define a poppet chamber 164 within. The poppet chamber 164 includes a bottommost portion 165 and an uppermost portion 167. The bottommost portion 165 has a diameter that is greater than a diameter of the uppermost portion 167, forming an annular shoulder 169 between the bottommost portion 165 and the uppermost portion 167. The poppet chamber 164 is configured to slidably receive the poppet bulb 116 and pilot piston 118 within.

The side wall 162 defines at least one port 166a,b that extends from the poppet chamber 164 to an exterior of the poppet body 120. The end plate 160 defines an opening 168 that extends from the poppet chamber 164 to an exterior of the poppet body 120. The opening 168 is configured to slidably receive the poppet extension 159 of the pilot piston 118 therethrough. The opening 168 defines a sealing groove 171 configured to receive an o-ring (not shown) within. The o-ring is configured to fluidly seal the poppet extension 159 with the opening 168 of the end plate 160.

The poppet cap 122 defines a cap channel 170 that extends through the poppet cap 122 from a first opening 172 to a second opening 174. The first opening 172 is in fluid communication with the reset channel 144 of the pilot piston 118. The cap channel 170 has a diameter that is greater than a diameter of the reset channel 144. The poppet cap 122 defines a sealing groove 176 that extends about an outer perimeter of the poppet cap 122. The sealing groove 176 is configured to receive an o-ring (not shown) within. The o-ring is configured to fluidly seal the poppet cap 122 with the inner surface 113 of the component chamber 117.

The poppet cap 122 is positioned above and coupled to the poppet body 120. In an aspect, the poppet cap 122 and the poppet body 120 are integrally formed into a single component. The poppet cap 122 may be spaced from the poppet body 120 forming a first pressure relief channel 178 therebetween. The first pressure relief channel 178 is in fluid communication with the at least one hole 119 of the second body portion 105 of the main body 102 via a second pressure relief channel 179. The second pressure relief channel 179 is formed between an outer surface of the poppet body 120 and the inner surface 113 of the second body portion 105.

The main body cap 124 defines an outer sealing surface 180 and a sealing groove 182. The outer sealing surface 180 is configured to engage with the inner surface 113 of the component chamber 117. The sealing groove 182 is configured to receive an o-ring (not shown) within. The o-ring is configured to fluidly seal the main body cap 124 with the main body 102. The main body cap 124 may be coupled to the main body 102 by bolts, screws, welding, adhesives, or by other coupling means.

The poppet cap 122 is positioned below the main body cap 124 in the component chamber 117. An upper surface of the poppet cap 122, a lower surface of the main body cap 124, and the inner surface 113 of the component chamber 117 form a first pressure cavity 184 within the component chamber 117. The upper surface of the poppet cap 122 includes an upper spring support 186, and the lower surface of the main body cap 124 includes a lower spring support 188. The upper spring support 186 and the lower spring support 188 are configured to support a second spring 190 within the first pressure cavity 184. Although the second spring 190 illustrates a spring, it will also be appreciated that the second spring 190 may include other resilient members known and used in the art.

With reference to FIG. 5, the poppet bulb 116 is positioned adjacent to the pilot piston 118 such that a second pressure cavity 192 is formed therebetween. The second pressure cavity 192 is formed between a surface on the poppet bulb 116 in which the second opening 130 of the first flow channel 126 is disposed and a surface on the pilot piston 118 in which the first opening 146 inlet channel 140 is disposed. The pilot piston 118 is positioned adjacent to the poppet body 120 such that a third pressure cavity 194 is formed therebetween. The third pressure cavity 194 is formed between an upper shoulder 193 of the pilot piston 118 and a surface of the end plate 160 of the poppet body 120 in which the opening 168 is disposed.

The upper surface 161 of the poppet extension 159 of the pilot piston 118 is positioned adjacent to a lower surface of the poppet cap 122 such that a third pressure relief channel 196 is formed therebetween. The third pressure relief channel 196 is formed between the upper surface 161 of the poppet extension 159 and a surface on the poppet cap 122 in which the first opening 172 of the cap channel 170 is disposed.

Figure 6:
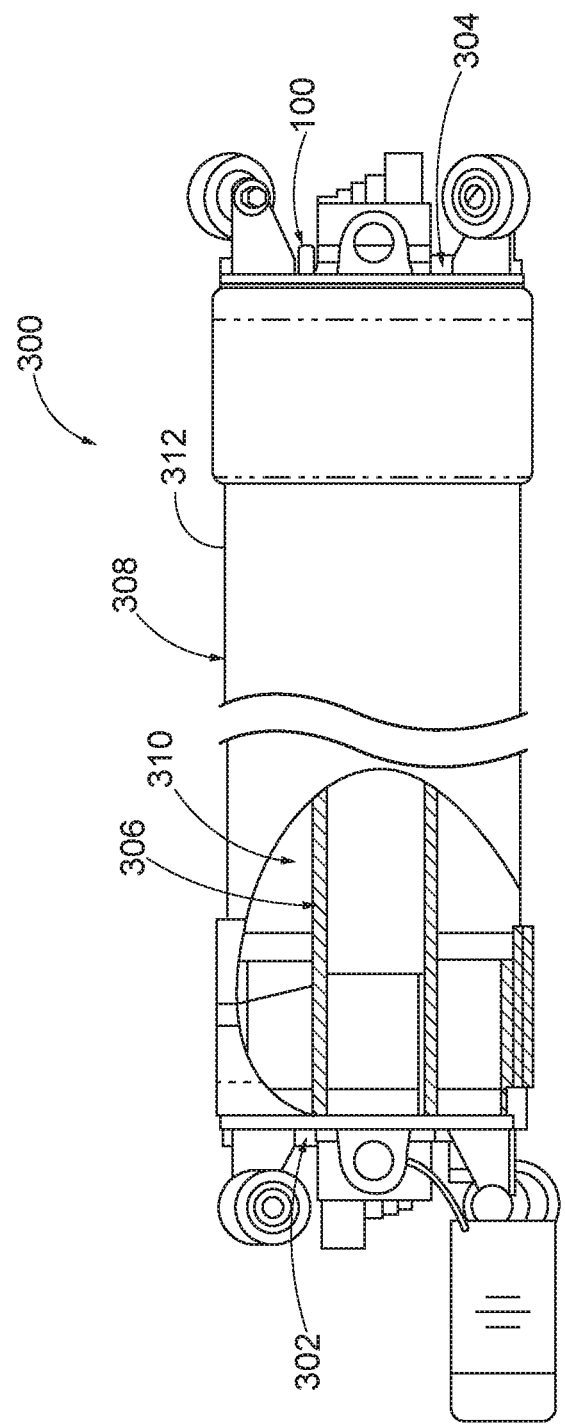
FIG. 6 is a side view of an inflatable plug, according to an aspect of the disclosure.

FIG. 6 illustrates an inflatable plug 300, according to an aspect of this disclosure. The plug 300 includes a first end plate assembly 302, a second end plate assembly 304, a flow-through conduit 306, a tubular member 308, and a central chamber 310. The plug 300 has a generally cylindrical shape that is elongate along an axis, which extends centrally through the plug 300, from the first end plate assembly 302 at a first end to the end plate assembly 304 at a second end. The tubular member 308 and the flow-through conduit 306 are coupled to the first end plate assembly 302 at the first end and coupled to the second end plate assembly 304 at the second end.

The inflatable plug 300 further includes the pressure relief valve 100 coupled to at least one of the first end plate assembly 302 and the second end plate assembly 304. The pressure relief valve 100 may be coupled to either plate assembly 302 or 304 of the plug 300. In alternative aspects, multiple pressure relief valves 100 may be coupled to one or both plate assemblies 302 and 304 of the plug 300. The relief valve 100 may be coupled to the plug 300 such that a portion of the relief valve 100 positioned within the plug 300 is substantially equal to a portion of the relief valve 100 positioned outside of the plug 300.

It will be appreciated that the plug 300 may include a variety of configurations of plugs configured to fit within a pipeline and inflate to a predetermined pressure. The central chamber 310 is inflated to a predetermined pressure, at which point an outer surface 312 of the plug 300 contacts an inner surface of a pipeline (not shown). The outer surface 312 of the plug 300 may be coated with a sealant material so that when the outer surface 312 contacts the inner surface of the pipeline, the sealant material contacts and adheres to the pipeline, thereby sealing any cracks, holes, or other flaws in the pipeline needing repair.

The relief valve 100 is configured to relieve pressure within the central chamber 310 of the plug 300. Referring again to FIG. 2, which illustrates the relief valve 100 in the closed position, the first portion 103 is configured to couple to the inflatable plug 300, such that the central chamber 310 of the plug is in fluid communication with the main channel 112 of the relief valve 100. In the closed position of the relief valve 100, a pressure of a fluid within the central chamber 310 is substantially the same as a pressure of the fluid in the main channel 112.

The pressure in the main channel 112 is communicated to the second pressure cavity 192 via the first flow channel 126 of the poppet bulb 116. The pressure in the main channel 112 is further communicated to the third pressure cavity 194 via the first flow channel 126 of the poppet bulb 116, the inlet channel 140 of the pilot piston 118, and the pressure channel 142 of the pilot piston 118. The pressure in the main channel 112 is further communicated to the first pressure cavity 184 via the first flow channel 126 of the poppet bulb 116, the inlet channel 140 of the pilot piston 118, the reset channel 144 of the pilot piston 118, and the cap channel 170 of the poppet cap 122.

As fluid pressure in the main channel 112 of the relief valve 100 increases, the relief valve 100 transitions from the closed position (FIG. 2), to the first intermediate position (FIG. 4), and to the open position (FIG. 3).

The pressure communicated to the third pressure cavity 194 acts on the pilot piston 118 in a direction towards the first end 108 of the relief valve 100. A pressure force in the third pressure cavity 194 is counteracted by the first spring 158 positioned within the second annular groove 152 of the pilot piston 118 and the annular groove 136 of the poppet bulb 116. In the closed position, the upper surface 161 of the poppet extension 159 of the pilot piston 118 is seated against the lower surface of the poppet cap 122, such that an annular flow area of the third pressure relief channel 196 is substantially zero preventing fluid communication between the first pressure cavity 184 and the first pressure relief channel 178. A pressure force in the first pressure cavity 184 and the second spring 190 positioned within the first pressure cavity 184 act on an upper surface of the poppet cap 122 in a direction towards the first end 108 of the relief valve 100. In the closed position, the pressure force in the first pressure cavity 184 and the spring force of the first spring 158 keep the annular sealing ring 132 and the annular sealing surface 134 in contact with the first inner surface 111 of the main channel 112 at the second opening 115, which substantially prevents any leakage of fluid pressure to atmosphere.

As the pressure within the main channel 112 increases to produce a fluid force within the third pressure cavity 194 to equal a spring force of the first spring 158, the third pressure relief channel 196 begins to open (e.g. the pilot piston 118 begins to move toward the first end 108 of the relief valve 100) such that the fluid pressure in the first pressure cavity 184 becomes in fluid communication with the first pressure relief channel 178. This pressure that causes the fluid force to equal the spring force of the first spring 158 may be referred to as a "crack", "leak," or "trigger" pressure.

As the pressure within the main channel 112 continues to increase, the fluid pressure within the main channel 112 is communicated to the third pressure cavity 194 (e.g. the pressure in the third pressure cavity 194 is substantially equivalent to the pressure within the main channel 112). Once the pressure within the third pressure cavity 194 increases enough to overcome the spring force of the first spring 158, the relief valve 100 transitions to the first intermediate position (FIG. 4). In transitioning from the closed position to the first intermediate position, the pilot piston 118 moves in the direction towards the first end 108 of the relief valve, decreasing a size of the second pressure cavity 192 and increasing a size of both the third pressure cavity 194 and the third pressure relief channel 196. In the first intermediate position, the upper surface 161 of the poppet extension 159 of the pilot piston 118 is spaced away from the lower surface of the poppet cap 122, such that the annular flow area of the third pressure relief channel 196 is at a maximum. The maximum annular flow area of the third pressure relief channel 196 allows fluid communication between the first pressure cavity 184 and the atmosphere via the third pressure relief channel 196, the first pressure relief channel 178, the second pressure relief channel 179, and the at least one hole 119 of the second body portion 105 of the main body 102. In the first intermediate position, the main channel 112 and the third pressure cavity 194 are also in fluid communication with the atmosphere, but only through the relief channel 144, the first pressure relief channel 178, the second pressure relief channel 179, and the at least one hole 119 of the second body portion 105 of the main body 102.

The maximum annular flow area of the third pressure relief channel 196 is greater than a diameter of the reset channel 144 of the pilot piston 118, which allows the pressure within the first pressure cavity 184 to fall to atmospheric pressure more quickly than the reset channel 144 can refill the pressure in the first pressure cavity 184. The ratio of the flow area attributable to the maximum annular flow area of the third pressure relief channel 196 to the flow area of the reset channel 144 defines an aspect of the dynamic response of the valve. A greater ratio will equalize pressure in the first pressure cavity 184 more quickly than a smaller ratio. Because the diameter of the reset channel 144 is small, the flow into the third pressure cavity 194 is significantly greater than the flow out through the reset channel 144, the pressure within the third pressure cavity 194 is substantially equal to the pressure within the main channel 112.

As the pressure within the first pressure cavity 184 drops as the pressure within is released to the atmosphere, the pressure within the main channel 112 overcomes the pressure in the first pressure cavity 184 and a force of the second spring 190. At this point, the relief valve 100 transitions from the first intermediate position to the open position (FIG. 3). During this transition, the poppet bulb 116, the pilot piston 118, the poppet body 120, and the poppet cap 122 move toward the second end 110 of the relief valve 100. The movement of the poppet bulb 116 toward the second end 110 unseats the annular sealing ring 132 and the annular sealing surface 134 from the first inner surface 111 of the main channel 112 at the second opening 115. The movement of the poppet body 120 toward the second end 110 moves the poppet body 120 away from the at least one hole 119, which allows fluid communication between the second body portion 105 and the atmosphere via the at least one hole 119. After the poppet bulb 116, the pilot piston 118, the poppet body 120, and the poppet cap 122 move toward the second end 110 of the relief valve 100, the relief valve is in the open position such that the main body 112 is in fluid communication with the atmosphere via the second opening 115 and the at least one hole 119. In the open position, the pressure within the main channel 112 is vented to atmosphere quicker than in the first intermediate position of the relief valve 100, and the pressure in the main channel 112 and the plug 300 decreases. As the valve relieves pressure within the main channel 112, the pressure flow exits the main channel 112 and through the at least one hole 119 in a radial direction.

As the pressure within the main channel 112 decreases, the first spring 158 eventually overcomes the pressure within the third pressure cavity 194, which approximately equals the pressure within the main channel 112 and decreases while the relief valve is in the open position. A spring constant of the first spring 158 may be selected based on a desired pressure of the plug 300, such that the first spring 158 begins the transition from the open position to the closed position once the desired pressure is achieved. The relief valve 100 transitions from the open position to the second intermediate position (FIG. 5) once the desired pressure within the plug 300 is reached. During transition from the open position to the second intermediate position, the pilot piston 118 moves toward the second end 110 of the relief valve 100, seating the upper surface 161 of the poppet extension 159 of the pilot piston 118 with the lower surface of the poppet cap 122.

In the second intermediate position, the annular flow area of the third pressure relief channel 196 is substantially zero since the o-ring (not shown) seated in the second sealing groove 163 seals against the lower surface of the poppet cap 122 preventing fluid communication between the first pressure cavity 184 and the first pressure relief channel 178. Since fluid communication between the first pressure cavity 184 and the first pressure relief channel 178 is substantially prevented, pressure release from the first pressure cavity 184 to the atmosphere is substantially prevented. With pressure release from the first pressure cavity 184 being substantially prevented, the main channel 112 begins to re-pressurize the first pressure cavity 184 via the first flow channel 126 of the poppet bulb 116, the inlet channel 140 of the pilot piston 118, the reset channel 144 of the pilot piston 118, and the cap channel 170 of the poppet cap 122. After the pressure within the first pressure cavity 184 and the spring force of the second spring 190 are sufficient to overcome the pressure within the main channel 112, the relief valve 100 transitions from the second intermediate position to the closed position.

When the relief valve 100 is not coupled to the plug 300 or any other pressure vessel, the relief valve 100 is in the closed position. The force of the second spring 190 forced the poppet bulb 116, the pilot piston 118, the poppet body 120, and the poppet cap 122 toward the first end 108 of the relief valve 100.

The first opening 128 of the poppet bulb 116 is substantially perpendicular to a pressure flow through the main channel 112, such that the main channel 112 is aligned with the first flow channel 126 of the poppet bulb 116. The orientation of the first opening 128 enables the relief valve 100 to accurately measure a total pressure (e.g. stagnation pressure) in the main channel 112.

A benefit of the relief valve 100 is a reduced pressure hysteresis. This allows for a quick release of pressure after the pressure within the main channel 112 exceeds a desired upper pressure limit. The relief valve 100 may transition to the open position quickly, the pressure may have a high flow rate to atmosphere causing the pressure within the channel 112 to drop quickly. After the pressure within the main channel 112 drops below the desired upper pressure limit, the poppet bulb 116 is quickly shut. The relief valve 100 achieves a maximum flow rate at a pressure lower than a traditional single stage valve. The relief valve 100 closes at a pressure lower than which it opened, but higher than the pressure of a traditional single stage valve.

Although reference is made to the relief valve 100 in the above described example, it will be appreciated that this method may also be employed by alternative aspects of the relief valve 100 as further described below.

Figure 7:
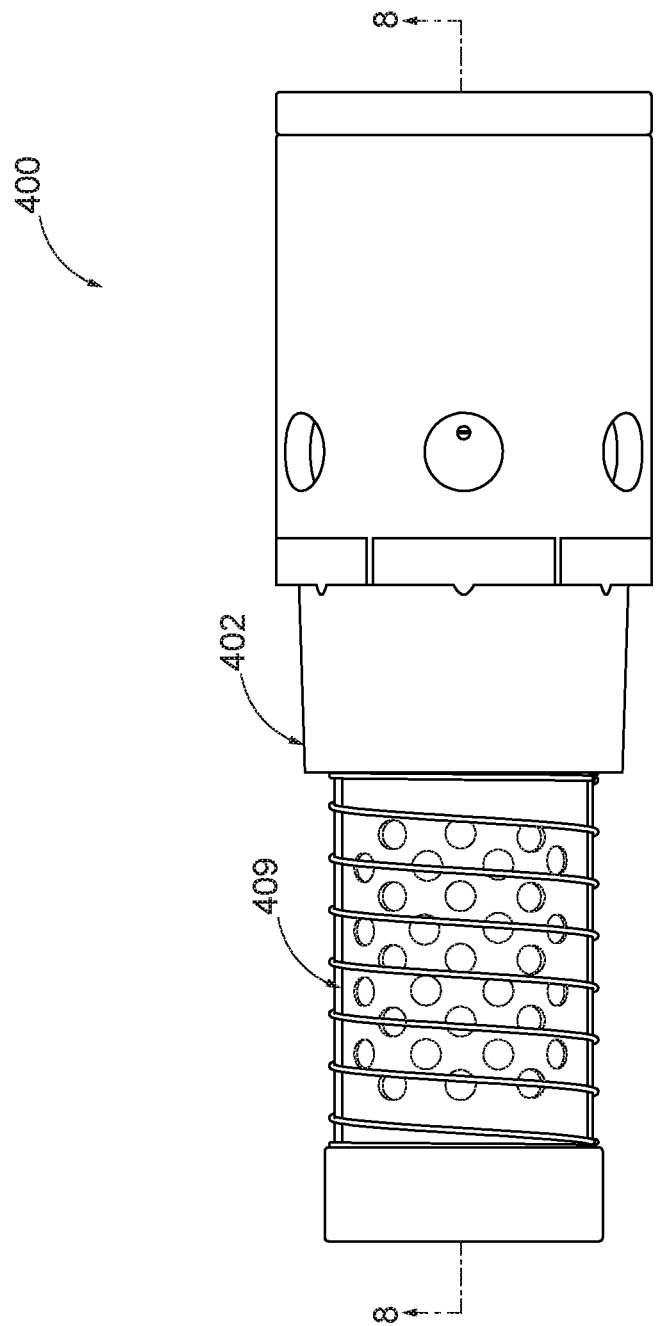
FIG. 7 illustrates a side view of an alternative aspect of a pressure relief valve in which the systems, methods, and apparatus disclosed herein may be embodied.
Figure 8:
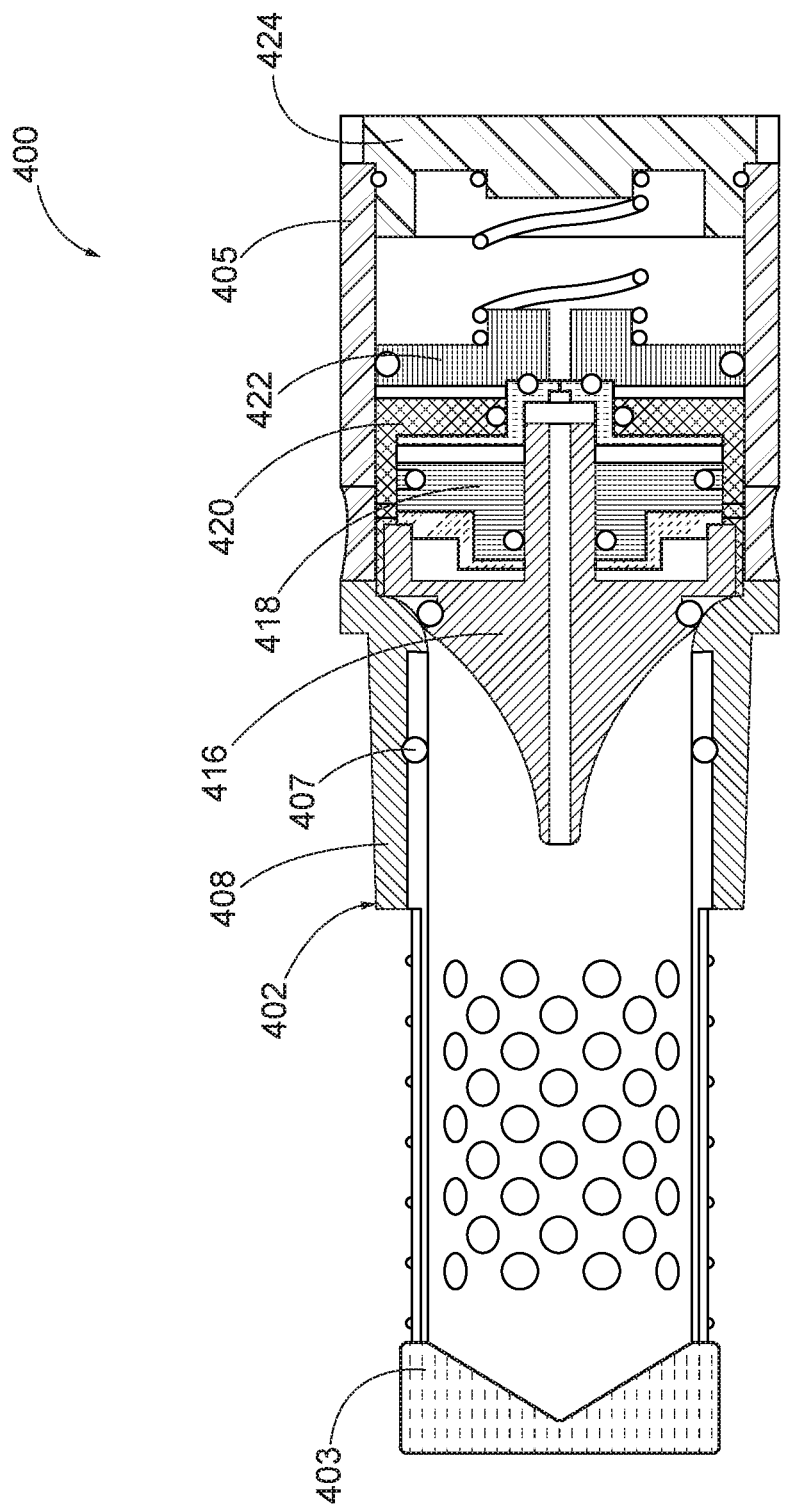
FIG. 8 illustrates a cross sectional view of the pressure relief valve illustrated in FIG. 7 taken along line 8-8 in a closed position.

FIG. 7 provides a side view of a dual stage pressure relief valve 400, according to an alternative aspect of this disclosure. FIG. 8 provides a side view of a cross section of the dual stage relief valve 400 in a closed position taken along line 8-8 of FIG. 7. Portions of the aspects of the relief valve 400 disclosed in FIGS. 7 and 8 are similar to aspects of the relief valve 100 described above in FIGS. 1 through 5 and those portions function similarly to those described above.

The relief valve 400 has a main body 402 that includes a first body portion 403 and a second body portion 405. The first body portion 403 is positioned at least partially within and secured to a first end 408 (e.g. male left hand national pipe thread (NPT)) of the second body portion 405. An exterior of the first end 408 of the second body portion 405 may include a threaded portion (not shown). The threaded portion is configured to engage a corresponding threaded portion of an inlet to a pressure vessel. An annular sealing ring 407 is positioned between the first and second body portions 403 and 405. The first body portion 403 includes a filter 409 positioned thereon that is configured to prevent contaminants from inside the pressure vessel to which the relief valve 400 is attached from entering into the relief valve 400.

The relief valve 400 further includes a poppet bulb 416, a pilot piston 418, a poppet body 420, a poppet cap 422, and a main body cap 424. The poppet bulb 416, the pilot piston 418, the poppet body 420, the poppet cap 422, and the main body cap 424 may function substantially similarly to the poppet bulb 116, the pilot piston 118, the poppet body 120, the poppet cap 122, and the main body cap 124, respectively, of the relief valve 100. It will be appreciated, that the size and/or position of each of the components within the relief valve 400 may differ from the size and/or position of each of the components within the relief valve 100.

Figure 9:
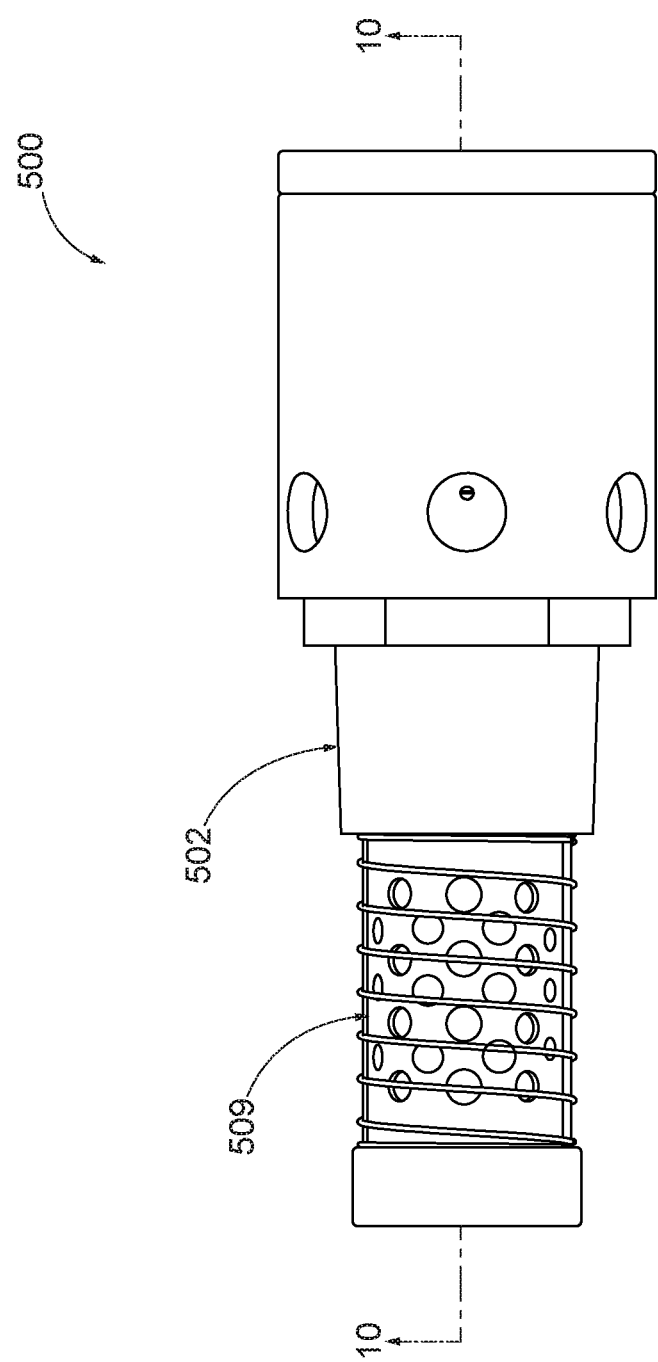
FIG. 9 illustrates a side view of an alternative aspect of a pressure relief valve in which the systems, methods, and apparatus disclosed herein may be embodied.
Figure 10:
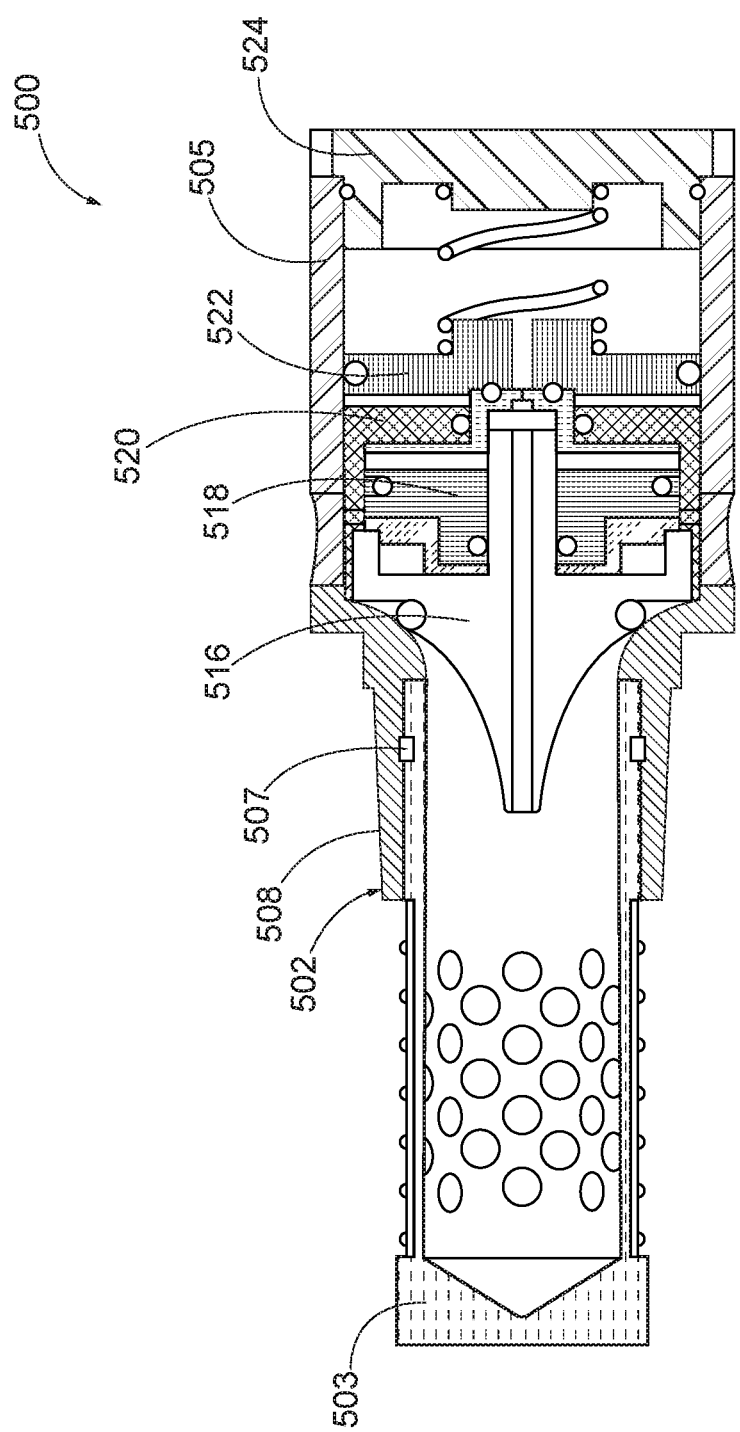
FIG. 10 illustrates a cross sectional view of the pressure relief valve illustrated in FIG. 9 taken along line 10-10 in a closed position.

FIG. 9 provides a side view of a dual stage pressure relief valve 500, according to an alternative aspect of this disclosure. FIG. 10 provides a side view of a cross section of the dual stage relief valve 500 in a closed position taken along line 10-10 of FIG. 9. Portions of the aspects of the relief valve 500 disclosed in FIGS. 9 and 10 are similar to aspects of the relief valve 100 described above in FIGS. 1 through 5 and the relief valve 400 described in FIGS. 7 and 8, and those portions function similarly to those described above.

The relief valve 500 has a main body 502 that includes a first body portion 503 and a second body portion 505. The first body portion 503 is positioned at least partially within and secured to a first end 508 of the second body portion 505. An annular sealing ring 507 is positioned between the first and second body portions 503 and 505. The first body portion includes a filter 509 positioned thereon that is configured to prevent contaminants from inside the pressure vessel to which the relief valve 500 is attached from entering into the relief valve 500.

The relief valve 500 further includes a poppet bulb 516, a pilot piston 518, a poppet body 520, a poppet cap 522, and a main body cap 424. The poppet bulb 516, the pilot piston 518, the poppet body 520, the poppet cap 522, and the main body cap 524 may function substantially similarly to the poppet bulb 116, the pilot piston 118, the poppet body 120, the poppet cap 122, and the main body cap 124, respectively, of the relief valve 100, and the poppet bulb 416, the pilot piston 418, the poppet body 420, the poppet cap 422, and the main body cap 424, respectively, of the relief valve 400. It will be appreciated, that the size and/or position of each of the components within the relief valve 500 may differ from the size and/or position of each of the components within the relief valves 100 and 400.

The relief valves 100, 400, and 500 may include various sizes, such that the relief valves 100, 400, and 500 may be coupled to pressure vessels with various size inlets. For example, an outer diameter of the first ends 408 and 508 of the second body portions 405 and 505 may be sized according to an inlet of a specific pressure vessel. As illustrated in FIGS. 7 and 9, the first end 408 of the second body portion 405 is greater than the first end 508 of the second body portion 505. Therefore, the first end 408 of the second body portion 405 is configured to be positioned within a pressure vessel with an inlet size that is greater than an inlet size of a pressure vessel configured to receive the first end 508 of the second body portion 505.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A pressure relief valve comprising:
   a main body having a first end and a second end, the first end of the main body defining a main channel that extends from a first opening to a second opening;
   a poppet bulb defining a first flow channel, the first flow channel extending through the poppet bulb from a first opening to a second opening, the first opening of the first flow channel being in fluid communication with the main channel;
   a pilot piston defining an inlet channel, a pressure channel, and a reset channel, the inlet channel extending from a first opening to the pressure channel and to the reset channel, the first opening of the inlet channel being in fluid communication with the first flow channel of the poppet bulb; and
   a poppet cap defining a cap channel, the cap channel extending through the poppet cap from a first opening to a second opening, the first opening of the cap channel being in fluid communication with the reset channel of the pilot piston, the cap channel having a diameter that is greater than a diameter of the reset channel, the second opening of the cap channel being in fluid communication with a pressure cavity defined by the poppet cap and the second end of the main body,
   wherein the pressure relief valve is operable between a closed position and an open position, wherein in the closed position the poppet bulb is located adjacent to the second opening of the main channel and in contact with an inner surface of the main channel such that a fluid flow through the main channel is substantially prevented, and wherein in the open position the poppet bulb is axially spaced from the second opening of the main channel toward the second end of the main body such that a fluid flow through the main channel is allowed, and
   wherein in the closed position of the pressure relief valve, fluid communication between the pressure channel of the pilot piston and atmosphere is substantially prevented.

2. The pressure relief valve of claim 1, wherein the pressure cavity is a first pressure cavity, and wherein a second pressure cavity is defined between the poppet bulb and the pilot piston, the second pressure cavity being positioned between the first flow channel defined by the poppet bulb and the inlet channel defined in the pilot piston, wherein the pressure relief valve is further operable to an intermediate position.

3. The pressure relief valve of claim 2, wherein in the intermediate position the poppet bulb is located adjacent to the second opening of the main channel and in contact with an inner surface of the main channel such that a fluid flow through the main channel is substantially prevented.

4. The pressure relief valve of claim 3, wherein the intermediate position is a first intermediate position, wherein the pressure relief valve is further operable to the open position and then to a second intermediate position, and wherein in the open position and the second intermediate position the poppet bulb is axially displaced toward the second end of the main body such that a fluid flow through the main channel to atmosphere is allowed.

5. The pressure relief valve of claim 4, wherein the pressure relief valve transitions from the closed position to the first intermediate position and to the open position when a pressure in the main channel is increasing, and wherein the pressure relief valve transitions from the open position to the second intermediate position and to the closed position when the pressure in the main channel is decreasing.

6. The pressure relief valve of claim 4, wherein the second end of the main body includes at least one hole that connects an interior of the main body to an exterior of the main body, wherein when the pressure relief valve is in either the open position or the second intermediate position the main channel is in fluid communication with the at least one hole, and wherein when the pressure relief valve is in the closed position the fluid communication is substantially prevented between the main channel and the at least one hole by the poppet bulb.

7. The pressure relief valve of claim 4, further comprising:
a poppet body defining an opening through which at least a portion of the pilot piston extends, the poppet body and the poppet cap defining a first pressure relief channel therebetween, the first pressure relief channel being in fluid communication with the at least one hole, the pilot piston and the poppet cap defining a second pressure relief channel therebetween, wherein in the open position of the pressure relief valve the at least one hole is in fluid communication with the first pressure cavity via the first pressure relief channel and the second pressure relief channel, and wherein in the closed position of the pressure relief valve a size of the second pressure relief channel is smaller than a size of the second pressure relief channel when the pressure relief valve is in the open position such that fluid communication between the at least one hole and the first pressure cavity is substantially prevented by the second pressure relief channel.

8. The pressure relief valve of claim 7, wherein the poppet bulb, the pilot piston, and the poppet body are axially aligned.

9. The pressure relief valve of claim 1, further comprising:
a first resilient member positioned between the poppet bulb and the pilot piston, the first resilient member configured to bias the poppet bulb and the pilot piston in opposing axial directions; and
a second resilient member positioned within the pressure cavity, the second resilient member configured to bias the poppet cap in an axial direction towards the first end of the main body.

10. The pressure relief valve of claim 9, wherein the first resilient member comprises a spring, and wherein the second resilient member comprises a spring.

11. The pressure relief valve of claim 1, wherein the first opening of the poppet bulb is substantially perpendicular to the fluid flow through the main channel.

12. The pressure relief valve of claim 1, wherein the main channel, the first flow channel, the inlet channel, and the reset channel are substantially parallel, and wherein the pressure channel is substantially perpendicular to the main channel, the first flow channel, the inlet channel, and the reset channel.

13. The pressure relief valve of claim 1, wherein in the closed position of the pressure relief valve, fluid communication between the reset channel of the pilot piston and atmosphere is substantially prevented.

14. A plug system for sealing a pipeline, the plug system comprising:
an inflatable plug including:
a tubular member having an outer surface that extends from a first end to a second end; and
a first plate and a second plate secured to the first end and the second end of the tubular member respectively, such that the first plate, the second plate, and the inner surface of the tubular member together define a central chamber of the inflatable plug, and
a dual stage pressure relief valve coupled to at least one of the first plate and the second plate, the dual stage pressure relief valve configured to release a pressure within the inflatable plug after a desired upper pressure limit is achieved within the inflatable plug, wherein the dual stage pressure relieve valve comprises:
a main body,
a pilot piston defining a reset channel in fluid communication with the central chamber of the inflatable plug, and
a poppet cap defining a cap channel in fluid communication with the reset channel of the pilot piston and with a pressure cavity defined by the poppet cap and an end of the main body,
wherein in a closed position of the pressure relief valve, fluid communication between the pressure cavity and atmosphere is substantially prevented, and wherein in an open position of the pressure relief valve, the pilot piston is spaced from the poppet cap defining a pressure relief channel therebetween, the pressure relief channel being in fluid communication with the pressure cavity and atmosphere.

15. The system of claim 14, wherein the main body defines a main channel that extends from a first opening to a second opening, wherein the dual stage pressure relief valve comprises:
a poppet bulb defining a first flow channel being in fluid communication with the main channel,
wherein the reset channel of the pilot piston is in fluid communication with the first flow channel of the poppet bulb, and
wherein the cap channel has a diameter that is greater than a diameter of the reset channel.

16. The system of claim 15, wherein the dual stage pressure relief valve is operable between a closed position and an open position, wherein in the closed position the poppet bulb is located adjacent to the second opening of the main channel and in contact with an inner surface of the main channel such that a fluid flow through the main channel is substantially prevented, and wherein in the open position the poppet bulb is axially spaced from the second opening of the main channel such that a fluid flow through the main channel is allowed.

17. A pressure relief valve comprising:
a main body having a first portion and a second portion, the first portion defining a main channel that extends from a first opening to a second opening, the second portion defining a component chamber;
a poppet bulb positioned within the component chamber, the poppet bulb defining a first flow channel being in fluid communication with the main channel;
a pilot piston positioned adjacent to the poppet bulb within the component chamber, the pilot piston defining a reset channel, the reset channel being in fluid communication with the first flow channel of the poppet bulb; and
a poppet cap defining a cap channel, the cap channel being in fluid communication with the reset channel of the pilot piston, the cap channel having a diameter that is greater than a diameter of the reset channel, an opening of the cap channel being in fluid communication with a pressure chamber defined by the poppet cap, the second portion of the main body, and a body cap,
wherein the pressure relief valve is operable between a closed position and an open position, wherein in the closed position the poppet bulb is located adjacent to the second opening of the main channel and in contact with an inner surface of the main channel such that a fluid flow through the main channel is substantially prevented, and wherein in the open position the pilot piston, the poppet bulb, and the poppet cap are spaced away from the second opening of the main channel such that a fluid flow through the second opening to atmosphere is allowed wherein in the closed position of the pressure relief valve, fluid communication between the pressure chamber and atmosphere is substantially prevented, and wherein in the open position fluid communication between the pressure chamber and atmosphere is allowed.

18. The pressure relief valve of claim 17, wherein the pressure relief valve is further operable to an intermediate position, wherein in the intermediate position the poppet bulb remains located adjacent to the second opening of the main channel and the pilot piston is axially displaced in a direction away from the poppet cap and towards the poppet bulb, and wherein in the intermediate position fluid communication between the pressure chamber and atmosphere is allowed.

19. The pressure relief valve of claim 18, wherein the intermediate position is a first intermediate position, wherein the pressure relief valve is further operable to a second intermediate position, wherein in the second intermediate position the pilot piston, the poppet bulb, and the poppet cap are spaced away from the second opening of the main channel and the pilot piston is axially displaced in a direction toward the poppet cap and away from the poppet bulb such that fluid communication between the pressure chamber and atmosphere requires a flow through the reset channel.

20. The pressure relief valve of claim 17, wherein the first flow channel of the poppet bulb has a first opening adjacent to the main channel of the main body, wherein the first opening is substantially perpendicular to the fluid flow through the main channel.

* * * * *

UNITED STATES PATENT AND TRADEMARK OFFICE
CERTIFICATE OF CORRECTION

PATENT NO. : 10,871,237 B2
APPLICATION NO. : 16/100540
DATED : December 22, 2020
INVENTOR(S) : Van Schoor et al.

Page 1 of 1

It is certified that error appears in the above-identified patent and that said Letters Patent is hereby corrected as shown below:

In the Claims

At Column 15, Line 1, (Claim 17), after "allowed" insert -- , --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*